United States Patent [19]

De Jong

[11] 4,105,822

[45] Aug. 8, 1978

[54] METHOD FOR THE APPLICATION OF A SPECTRAL-SELECTIVE COATING ON A PLATE

[75] Inventor: Jan De Jong, Rijswijk Z.H., Netherlands

[73] Assignee: Nederlandse Centrale Organisatie voor Toegepast-Natuurwetenschappelijk Onderzoek, The Hague, Netherlands

[21] Appl. No.: 672,677

[22] Filed: Apr. 1, 1976

[30] Foreign Application Priority Data

Apr. 10, 1975 [NL] Netherlands ............................ 7504277

[51] Int. Cl.$^2$ .......................... F24J 3/02; B05D 1/02; B05D 1/38
[52] U.S. Cl. .................................... 428/216; 126/270; 126/271; 237/1 A; 427/160; 428/336
[58] Field of Search ................ 427/160, 419 C, 374 F; 428/336, 433, 446, 216; 126/270, 271; 237/1 A

[56] References Cited

U.S. PATENT DOCUMENTS

| 3,863,621 | 2/1975 | Schoenfelder | 126/270 |
| 3,937,208 | 2/1976 | Katz et al. | 126/271 |

Primary Examiner—James R. Hoffmann
Attorney, Agent, or Firm—Watson, Cole, Grindle & Watson

[57] ABSTRACT

The invention relates to a solar collector comprising a fluid reservoir provided with a metal plate with a spectral-selective coating, which is brought on to the plate by providing the plate at first with a black enamel layer, then, during the cooling period of the enamelling process, by providing it with a layer of indium oxide by spraying indium chloride against the enamel and then by providing the plate with a layer of silicon oxide by atomizing silicon chloride against the indium oxide.

6 Claims, 2 Drawing Figures

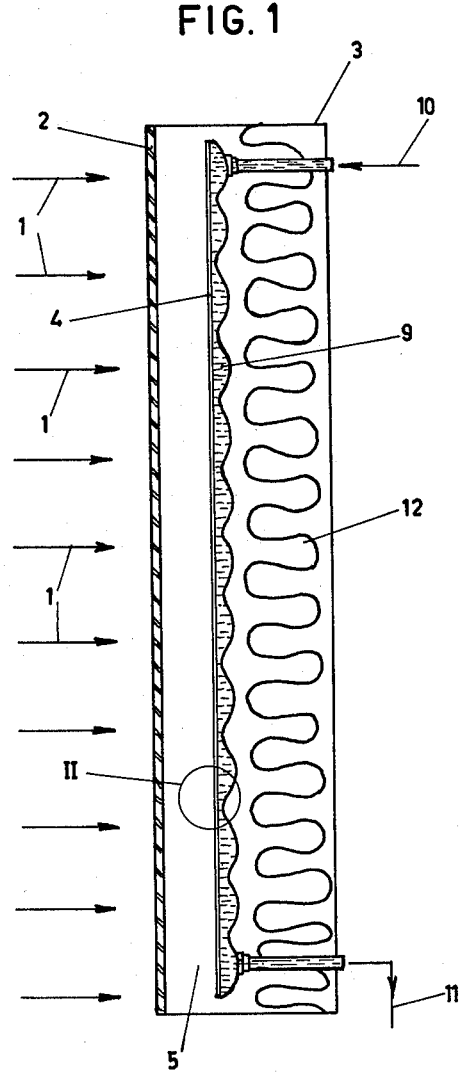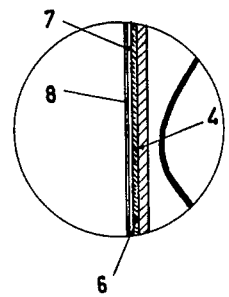

METHOD FOR THE APPLICATION OF A SPECTRAL-SELECTIVE COATING ON A PLATE

BACKGROUND OF THE INVENTION

The invention relates to a method for the application of a spectral-selective coating on to a metal collecting plate for solar heat and to a metal collecting plate coated according to that method.

On the one hand the object of the spectral-selective coating is to render the plate a strong absorption for sun rays, so that the plate can receive as much solar energy as possible and on the other hand its object is to keep the radiation of infrared rays from the plate as low as possible, so that the plate can rise in temperature.

SUMMARY OF THE INVENTION

Therefore, the method according to the invention is characterized in that the metal plate is provided with a black enamel layer and subsequently this layer is provided with a thin layer of a semi-conducting material, the conducting mechanism of which shows a metallic character.

In an embodiment of the invention, the semi-conducting layer is applied during the cooling period of the enamelling process. In so doing, preferably, a layer of indium oxide to the thickness of approximately 0.3 micron is applied. Such a layer can be obtained by spraying indium chloride against the enamel at a temperature of the enamel above 500° C.

The coating thus obtained is found to have an absorption-coefficient for sunlight of approximately 0.9 and a reflection-coefficient for heat rays of approximately 0.84.

It appears possible to improve the absorption-coefficient by applying over the indium oxide a very thin layer of approximately 100 millimicron of silicon oxide by atomizing silicon chloride or an organic silicon compound against the enamel immediately after spraying the indium chloride.

BRIEF DESCRIPTION OF THE DRAWING

The invention will now further be elucidated below with reference to a drawing of a solar collector, in which an embodiment of a coated plate according to the invention is applied.

The drawing shows in:

FIG. 1 a vertical cross-section of the box-shaped solar collector;

FIG. 2 a part of the collecting plate indicated by line II in FIG. 1 on an enlarged scale.

In the figures like ciphers refer to like elements.

In FIG. 1 sun radiation incident on glass window 2 is indicated by arrows 1. Window 2 forms part of housing 3, in which is incorporated metal collecting plate 4, which forms an air cavity 5 with window 2.

Collecting plate 4, which is provided with a spectral-selective coating consisting of a black enamel layer 6, a layer 7 of indium oxide and a layer 8 of silicon oxide, forms part of a fluid reservoir 9 with a supply 10 and a discharge 11.

Between reservoir 9 and housing 3 there is a layer 12 consisting of glass wool, which insulates reservoir 9 from loss of heat.

I claim:

1. A method for the application of a spectral-selective coating on a metal plate comprising the steps of providing a black enamel layer on the metal plate and subsequently applying a thin layer of a semi-conducting material, the conducting mechanism of which displays a metallic character, on the black enamel layer by spraying indium chloride against the enamel layer at a temperature of the enamel above 500° C. to obtain a layer of indium oxide of a thickness of approximately 0.3 micron.

2. A method according to claim 1, wherein the layer of indium oxide is applied during cooling of the black enamel layer.

3. A method according to claim 1, wherein a layer of silicon oxide of a thickness of approximately 100 millimicron is applied to the layer of indium oxide by atomizing silicon chloride against the enamel layer immediately after spraying the indium chloride.

4. A method according to claim 1, wherein a layer of silicon oxide of a thickness of approximately 100 millimicron is applied by atomizing an organic silicon compound against the enamel layer immediately after spraying the indium chloride.

5. A plate with a coating comprising a black enamel layer and a thin layer of indium oxide made according to the method of claim 1.

6. A metal collecting plate having a spectral-selective coating thereon comprising a metal plate, a black enamel layer on the plate, a layer of indium oxide having a thickness of approximately 0.3 micron on the enamel layer and a layer of silicon oxide having a thickness of approximately 100 millimicron over the layer of indium oxide.

* * * * *